Patented Nov. 3, 1953

2,658,097

UNITED STATES PATENT OFFICE 2,658,097

MANUFACTURE OF POSITIVE PLATES FOR LEAD STORAGE BATTERIES

Joseph A. Orsino, Mountain Lakes, N. J., assignor to National Lead Company, New York, N. Y., a corporation of New Jersey No Drawing. Application June 7, 1952, Serial No. 292,397

5 Claims. (Cl. 136—27)

This invention relates to the manufacture of lead-acid storage batteries. More particularly, it relates to a method of manufacturing the positive plates to be used in the storage batteries.

The present methods of manufacturing storage batteries are well known and generally similar in the basic steps involved. Active material comprising predominantly litharge, which may contain metallic lead, is mixed into a paste with water and sulfuric acid. This paste is pasted into battery grids to make up completed battery plates. Normally the positive plates are made from an active material consisting of litharge and finely divided metallic lead. The active material in the negative plates is the same except that it may contain an additional small percentage of expander ingredients.

After the pasted grid structures are dried, assembled and nested together with separators, they are placed into cell containers and immersed in a sulfuric acid electrolyte. The plates are then "formed" by passage of an electric current which serves to convert the active material in the positive plates to lead dioxide, and that in the negative plates to sponge lead. While the negative plates are readily formed in various strength electrolytes, the time of formation of the positive plates is affected by the concentration of the electrolyte. If the concentration of the electrolyte is too high, it is difficult to completely and rapidly form the positive plates. This is because a dense adherent layer of lead sulfate deposits on the surface of the active material in the positive plates retarding the conversion thereof to lead peroxide.

It is customary, therefore, to form the plates in a relatively dilute sulfuric acid electrolyte solution in which the formation proceeds readily. This dilute electrolyte is too weak, however, to serve as an operating electrolyte for subsequent service of the battery. Current practice is to dump this dilute electrolyte after formation and to refill the cells with an electrolyte of higher concentration for service use. After refilling an additional charging process, commonly referred to as a conditioning charge, is given to the battery to finally prepare it for use.

It will be noted from the above description that the prior art processes requires two different strength electrolytes, dumping and refilling operations, a forming charge and a conditioning charge to prepare the battery for use.

The principal object of this invention is to provide a method for forming positive storage battery plates in a strong electrolyte. Another object is to provide a method for forming positive storage battery plates in an electrolyte of such concentration that when the formation charge is completed the electrolyte will be of desirable strength for subsequent service operation. A further object is to eliminate the dumping and refilling operations and the need for a conditioning charge in the manufacture of storage batteries. These and other objects of this invention will be apparent from the following description thereof.

Broadly, the invention comprises treating the surface of the active material in storage battery positive plates so as to form thereon a thin deposit of a higher oxide of lead, for example lead peroxide. More specifically, the method comprises applying an oxidizing solution to the surfaces of the positive plates, this oxidizing solution forming a layer of a higher oxide of lead on the surface of the positive plate active material.

The oxidizing solution may be any oxidizing solution capable of forming higher oxides of lead, for example lead peroxide, on the surfaces of the active material in the positive plates. It may be an aqueous solution of an alkali metal peroxide such as sodium peroxide or potassium peroxide. The solution will be of convenient operating strength when it contains between 2% to 20% by weight of the alkali metal peroxide. A hydrogen peroxide solution may be employed although it is preferred to make such solution alkaline by addition, for instance of sodium or potassium hydroxide.

The oxidizing solution may be applied to the positive plates by immersing the plates in the solution or by applying the solution by dipping, painting, spraying or other known method. We have found it convenient to immerse the plates in the solution for an interval of time sufficient to form a thin deposit of higher oxides of lead on the surface of the active material in the positive plates. This deposit is substantially all lead peroxide. It is this layer which promotes the accelerated formation of the positive plates.

The following examples illustrate selected embodiments of this invention. In all the examples, the active material used was a finely divided calcined Barton litharge containing about 28% metallic lead. The active material for the negative plates had the usual small percentage of expander ingredients. The active material was made into a paste with water and sulfuric acid and pasted into the grid structure to form the plates according to the conventional procedure.

The positive test plates were then given the indicated treatment. After treatment, the positive plates were assembled into cell units together with negative plates not so treated and microporous rubber insulating separators. These cell units were placed in storage battery containers to constitute 15 plate batteries.

Control batteries were prepared from the same material in the same way with the exception of the oxidation treatment.

After formation the various batteries were disassembled and the positive plates examined. Visual determination of the percentage of active material area covered with white lead sulphate was taken as an indication of the degree of formation. A fully formed positive plate has a surface area completely cleared of lead sulfate.

EXAMPLE I

Test positive plates were immersed in an alkaline oxidizing solution, prepared in the proportions of 100 ml. of 10% sodium hydroxide to 14 grams of 30% hydrogen peroxide, for a period of 20 seconds. The plates were removed, drained and assembled into cell units with negative plates and separators. These units were placed in a battery container to form a 15 plate battery. A sulfuric acid electrolyte of 1.325 specific gravity was used to fill the battery cells and the battery was placed on charge at a rate of 15 amperes for 19 hours. The battery was disassembled and the positive plates examined. The surface of the active material in the positive plates was found to be completely cleared of lead sulfate, indicating complete formation of the positive plates. After formation, the electrolyte used in this example was examined and found to have a specific gravity of 1.280. This electrolyte is of conventional strength for subsequent service use of the battery. This example illustrates an important feature of this invention, which makes possible the complete and rapid formation of storage battery positive plates in strong electrolyte and the use of one strength electrolyte for formation of the positive plates and for the future service of the battery.

A control battery was prepared in a manner identical with that of Example I except that the oxidation step was omitted. This was placed on charge at a rate of 15 amperes for 40 hours. Upon dis-assembly and examination the surface of the positive plates was found to be covered with lead sulfate to the extent of 40%. The positive plates in the control battery charged at the same rate as Example I for more than twice the time given in Example I could not be formed.

Variations in the kind of oxidizing solution, its strength and manner of application are shown in the following examples. Benefits derived from the practice of this invention are shown where weaker formation electrolytes are used.

EXAMPLE II

Test positive plates were immersed in a 10% aqueous solution of sodium peroxide for 10 seconds. The plates were assembled into cell units with negative plates and separators. These units were placed in a battery container to form a 15 plate battery. A sulfuric acid electrolyte of 1.235 specific gravity was used to fill the battery cells and the battery was placed on charge at a rate of 15 amperes for 20 hours. The battery was dis-assembled and the positive plates examined. The surface of the active material in the positive plates was found to be completely cleared of lead sulfate.

A control battery was prepared in a manner identical with that of Example II except that the oxidation step was omitted. This was placed on charge at a rate of 15 amperes for 58 hours. Upon dis-assembly, the surface of the positive plates was found to be covered with lead sulfate to the extent of 20%.

EXAMPLE III

Test positive plates were immersed in a 5% aqueous solution of sodium peroxide for 10 seconds. The plates were removed, drained and assembled into cell units with negative plates and separators. These units were placed in a battery container to form a 15 plate battery. A sulfuric acid electrolyte of 1.060 specific gravity was used to fill the battery cells and the battery was placed on charge at a rate of 15 amperes for 18 hours. The battery was dis-assembled and the positive plates examined. The surface of the active material in the positive plate found to be completely cleared of lead sulfate.

EXAMPLE IV

Test positive plates were painted with a 10% aqueous solution of sodium peroxide. A battery was made the same as Example III, with 1.060 specific gravity electrolyte and placed on charge at 15 amperes for 18 hours. Upon dis-assembly, and examination the surface of the positive plates was found to be completely cleared of lead sulfate.

A control battery was prepared in a manner identical with that of Examples III and IV, except that the oxidation step was omitted. This was placed on charge at a rate of 15 amperes for 23 hours. Upon dis-assembly and examination, the surface of the positive plates was found to be covered with lead sulfate to the extent of 5%.

Table

| Examples or controls | Treatment | Sp. gr. of electrolyte | Formation time at 15 amps. rate, hrs. | Percent area of positive plate covered with lead sulfate | Final Electrolyte, sp. gr. |
|---|---|---|---|---|---|
| 1 | Solution of 10% NaOH and 30% H₂O₂ | 1.325 | 19 | None | 1.280 |
| Control | None | 1.325 | 40 | 40% | |
| 2 | 10% Na₂O₂ | 1.235 | 20 | None | |
| Control | None | 1.235 | 58 | 20% | |
| 3 | 5% NA₂O₂ | 1.060 | 18 | None | |
| 4 | 10% Na₂O₂ | 1.060 | 18 | None | |
| Control | None | 1.060 | 23 | 5% | |

The foregoing examples show how the practice of this invention makes possible the complete and rapid formation of positive storage battery plates in a strong electrolyte. They show how it is possible to completely and rapidly form positive storage battery plates in an electrolyte of such strength that its specific gravity after plate formation will be optimum for service and use in the battery during its life. These examples also show how my invention makes it possible to eliminate the dumping and refilling operations and the conditioning charge used in prior art methods of manufacture.

While the invention has been described and illustrated by the examples shown, it is not intended to be strictly limited thereto and other modifications and variations may be employed within the scope of the following claims.

I claim:
1. A method of manufacture of positive plates for lead-acid storage batteries which comprises applying an oxidizing solution to the prepared plates, said oxidizing solution comprising an aqueous solution of a compound selected from the group consisting of alkali metal peroxides, hydrogen peroxide and alkaline hydrogen peroxide, so as to form a thin deposit of lead peroxide on the surface of the active material in said plates, whereby the positive plates may be completely and rapidly formed in a battery formation electrolyte of high specific gravity.

2. A method of manufacture of positive plates for lead-acid storage batteries which comprises applying an oxidizing solution to the prepared plates, said oxidizing solution comprising an aqueous solution of a compound selected from the group consisting of alkali metal peroxides, hydrogen peroxide and alkaline hydrogen peroxide, so as to form a thin deposit of lead peroxide on the surface of the active material in said plates, whereby the positive plates may be completely and rapidly formed in a battery formation electrolyte.

3. A method of manufacture of positive plates for lead-acid storage batteries which comprises immersing the prepared plates in an oxidizing solution, said oxidizing solution comprising a 2% to 20% aqueous solution of a compound selected from the group consisting of alkali metal peroxides, hydrogen peroxide and alkaline hydrogen peroxide, so as to form a thin deposit of lead peroxide on the surface of the active material in said plates, whereby the positive plates may be completely and rapidly formed in a battery formation electrolyte.

4. A method of manufacture of positive plates for lead-acid storage batteries which comprises immersing the prepared plates in an oxidizing solution, said oxidizing solution comprising 2% to 20% aqueous solution of a compound selected from the group consisting of alkali metal peroxides, hydrogen peroxide and alkaline hydrogen peroxide, so as to form a thin deposit of lead peroxide on the surface of the active material in said plates, whereby the positive plates may be completely and rapidly formed in a battery formation electrolyte of high specific gravity.

5. A method of manufacture of positive plates for lead-acid storage batteries which comprises applying an oxidizing solution to the prepared and dried plates, said oxidizing solution comprising an aqueous solution of sodium peroxide, so as to form a thin deposit of lead peroxide on the surface of the active material in said plates, whereby the positive plates may be completely and rapidly formed in a battery formation electrolyte.

JOSEPH A. ORSINO.

References Cited in the file of this patent

UNITED STATES PATENTS

| Number | Name | Date |
| --- | --- | --- |
| 1,046,288 | Garde et al. | Dec. 3, 1912 |
| 2,287,868 | Daily | June 30, 1942 |

FOREIGN PATENTS

| Number | Country | Date |
| --- | --- | --- |
| 28,511 | Great Britain | of 1896 |